(12) United States Patent
Lin et al.

(10) Patent No.: US 6,801,812 B2
(45) Date of Patent: Oct. 5, 2004

(54) INPUT APPARATUS OF A HAND-HELD INFORMATION PROCESSING DEVICE

(75) Inventors: Huan-Jung Lin, Changhua (TW); Hsiao-Chen Chen, Yunlin (TW)

(73) Assignee: Darfon Electronics Corp., Taoyuan (TW)

( * ) Notice: Subject to any disclaimer, the term of this patent is extended or adjusted under 35 U.S.C. 154(b) by 191 days.

(21) Appl. No.: 10/213,524

(22) Filed: Aug. 6, 2002

(65) Prior Publication Data

US 2003/0065858 A1 Apr. 3, 2003

(30) Foreign Application Priority Data

Oct. 3, 2001 (TW) ........................................ 90124404 A

(51) Int. Cl.⁷ .............................................. G06F 13/00
(52) U.S. Cl. ........................... 700/84; 710/303; 345/168
(58) Field of Search ............................ 700/83, 84, 17; 710/303; 345/168, 169, 172

(56) References Cited

U.S. PATENT DOCUMENTS

2001/0001083 A1 * 5/2001 Helot .......................... 439/131
2003/0041206 A1 * 2/2003 Dickie ......................... 710/303

* cited by examiner

Primary Examiner—Emanuel Todd Voeltz
(74) Attorney, Agent, or Firm—Ladas & Parry

(57) ABSTRACT

An input apparatus for a hand-held information processing device. The input apparatus has a main connection port adapted to connect the hand-held information processing device and a transmission port adapted to connect a computer. The input apparatus also includes a route selection unit and a user selection device. The route selection unit, coupled between the main connection port and the transmission port, is configured to selectively establish a transmission route between the main connection port and the transmission port. The user selection device is configured to selectively output a first logic level and a second logic level. Further, the route selection unit cuts the transmission route when the user selection device outputs the first logic level, and the route selection unit makes the transmission route conductive when the user selection device outputs the second logic level.

15 Claims, 4 Drawing Sheets

INPUT APPARATUS OF A HAND-HELD INFORMATION PROCESSING DEVICE

FIELD OF THE INVENTION

The present invention relates generally to hand-held information processing devices and, in particular, to a portable hand-held information processing device keyboard which can automatically switch from data synchronization to keyboard function.

BACKGROUND OF THE INVENTION

In the fast paced business community, a personal digital assistant (PDA) or other hand-held device, which combines computer, communication and consumer electronics technologies, is becoming very popular due to its advantageous features including writing notes, recording names, addresses and phone numbers, and developing an appointment calendar. In the example of FIG. 1A, a hand-held information processing device 100, such as PDA, is typically mounted on a cradle 110 connected to a desktop or notebook computer 150 through a cable 120. In this manner, the hand-held information processing device 100 can synchronize and backup data with the computer 150. On the other hand, for the purposes of efficient and accurate data input and ease of text information handling, a conventional portable keyboard 130 is attached to the hand-held information processing device 100 to key in data as shown in FIG. 1B.

A hand-held information processing device attracts users due to its pocket size which allows easy transport. However, users still have to carry a cradle and a portable keyboard to synchronize data and perform data input in some occasions. It is inconvenience for hand-held information processing device to carry the additional devices.

Accordingly, it is necessary to develop a portable keyboard for a hand-held information processing device, unencumbered by the limitations associated with the prior art.

SUMMARY OF THE INVENTION

It is an object of the present invention to provide an input apparatus for a hand-held information processing device, particularly, an input apparatus providing both hand-held input and data synchronization functions.

It is another object of the present invention to provide a portable keyboard for a hand-held information processing device that can switch to keyboard function automatically after completion of data synchronization.

The present invention is generally directed to an input apparatus of a hand-held information processing device for selectively connecting the hand-held information processing device to a computer. According to one aspect of the invention, the input apparatus includes a main connection port, a transmission port, a route selection unit and a user selection device. The main connection port is adapted to connect the hand-held information processing device and the transmission port is adapted to connect the computer. The route selection unit, coupled between the main connection port and the transmission port, is configured to selectively establish a first transmission route between the main connection port and the transmission port. The user selection device is configured to selectively output a first logic level and a second logic level. Moreover, the user selection device outputs the first logic level to cause the route selection unit to cut the first transmission route, and the user selection device outputs the second logic level to cause the route selection unit to make the first transmission route conductive.

According to another aspect of the invention, a portable keyboard is provided for use in a hand-held information processing device. The portable keyboard has a keyboard controller, a serial transmission port, a main connection port, a route selection unit, a sync button and a combinational logic circuit. The keyboard controller includes a keyboard transmit data pin and a keyboard control pin. The serial transmission port includes a serial transmit data pin and a data set ready pin. The main connection port has a serial receive data pin, a main control pin and a data terminal ready pin, and the main connection port is adapted to connect the portable keyboard to the hand-held information processing device. The route selection unit is responsive to a select signal. When the select signal is at a first logic level, the route selection unit is configured to electrically couple the keyboard transmit data pin to the serial receive data pin, to electrically couple the keyboard control pin to the main control pin and make the data terminal ready pin electrically floating. When the select signal is at a second logic level, the route selection unit is configured to electrically couple the serial transmit data pin to the serial receive data pin, to electrically couple the data set ready pin to the data terminal ready pin and make the main control pin electrically floating.

Furthermore, the sync button has a first output terminal electrically coupled to the main control pin and has a second output terminal. The sync button provides the first logic level and the second logic level at the first output terminal and the second output terminal, respectively. The combinational logic circuit is used to produce the select signal. One input terminal of the combinational logic circuit is electrically coupled to the data set ready pin, and the other input terminal of the combinational logic circuit electrically is coupled to the second output terminal of the sync button. Additionally, the combinational logic circuit sets the select signal to the second logic level except when the second output terminal of the sync button and the data set ready pin both are at the first logic level.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE PREFERRED EMBODIMENT

Figure 1B:
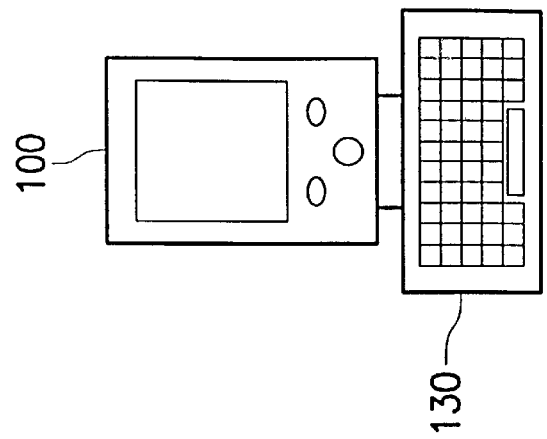
FIG. 1B is a conceptual diagram of a conventional portable keyboard attached to the hand-held information processing device to input data to the device.
Figure 1A:
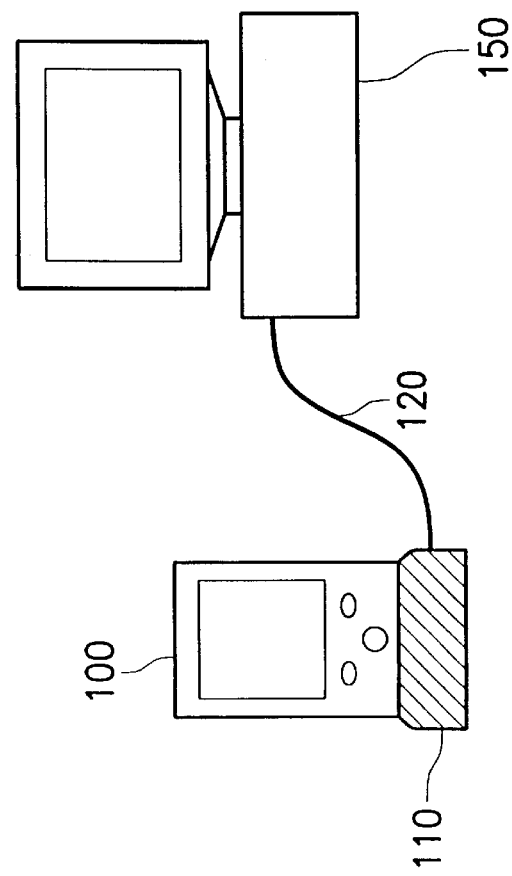
FIG. 1A is a conceptual diagram of a hand-held information processing device combined with a conventional cradle to synchronize data with a computer.
Figure 2:
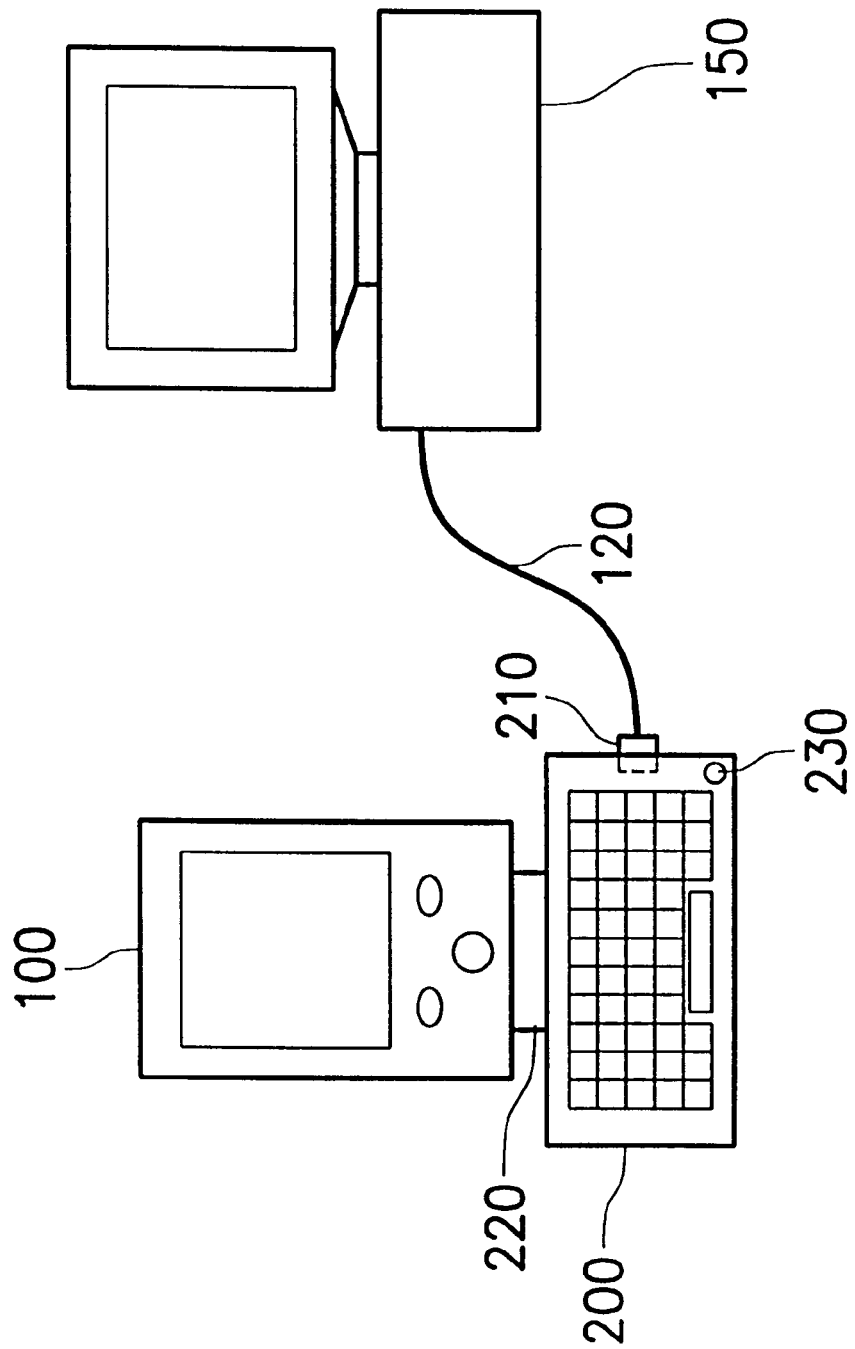
FIG. 2 is a conceptual diagram of a portable keyboard according to the invention.

A hand-held information processing device such as PDA can synchronize data with a computer or use a keyboard as an input device by serial connection, and thus both keyboard and data synchronization functions are integrated in a portable keyboard in accordance with the invention. Referring to FIG. 2, a portable keyboard 200 of the invention has a main connection port 220 and a serial transmission port 210. The portable keyboard 200 is attached to the hand-held information processing device 100 through the main connection port 220 and connected to a computer 150 through the serial transmission port 210 and a cable 120. Normally, a user is able to input data by the portable keyboard 200. Moreover, the portable keyboard 200 also includes a sync button 230. Once the sync button is pushed, the portable keyboard 200 synchronizes data in the hand-held device 100 with the computer 150. After completion of data synchronization, the portable keyboard 200 automatically returns to perform keyboard input function.

In other words, the portable keyboard 200 includes a main connection port 220, a serial transmission port 210, a keyboard controller (input controller) 240, a route selection unit 250 and a user selection device 230. The main connection port 220 is adapted to connect the hand-held information processing device 100 and the transmission port 210 is adapted to connect the computer 150. In the preferred embodiment, the transmission port 210 is an RS-232 port compliant with RS-232 asynchronous transmission standard. The keyboard controller 240 is provided to process input signals related to the keys pressed by a user. The route selection unit 250 is coupled to the main connection port 220, the keyboard controller 240 and the transmission port 210. The route selection unit 250 is configured to selectively establish a first transmission route $P_1$ between the main connection port 220 and the transmission port 210, or to selectively establish a second transmission route $P_2$ between the main connection port 220 and the keyboard controller 240. In addition, the user selection device 230 selectively outputs a first logic level and a second logic level. When the user selection device 230 outputs the first logic level, the route selection unit 250 selects the second transmission route $P_2$. Alternatively, when the user selection device 230 outputs the second logic level, the route selection unit 250 selects the first transmission route $P_1$. The first transmission route $P_1$ further includes a control route. Therefore, the hand-held information processing device 100 passes a control signal through the control route to control a sustain period of the second logic level. In this way, this ensures that the portable keyboard 200 automatically returns to keyboard function after completion of data synchronization.

Figure 3A:
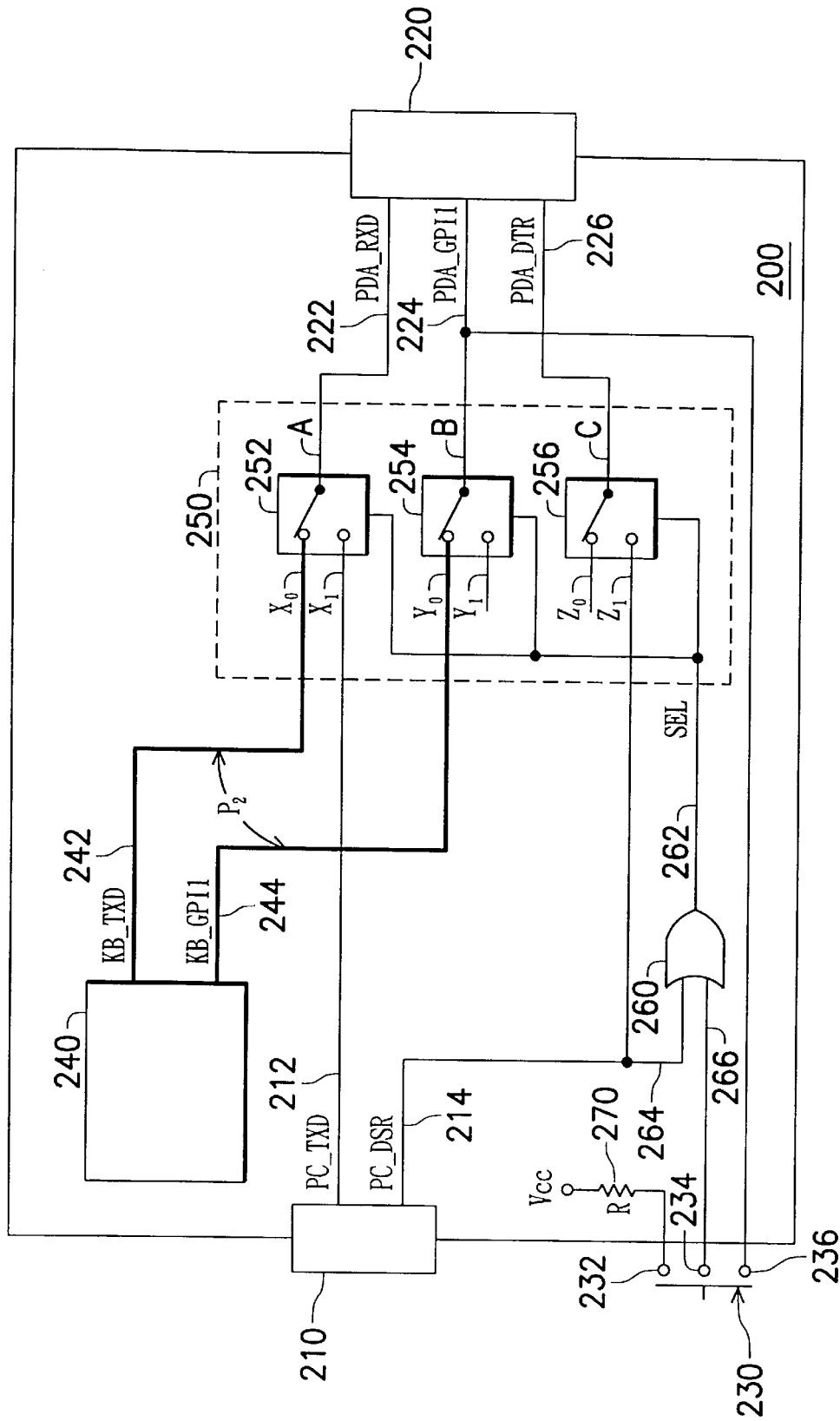
FIG. 3A is schematic diagram illustrating data input from the portable keyboard to the hand-held information processing device according to the invention.

FIG. 3A illustrates a detailed schematic diagram of the portable keyboard 200. The keyboard controller 240, including a keyboard transmit data (KB_TXD) pin 242 and a keyboard control (KB_GPI1) pin 244, provides keyboard control and interpretation functions. The serial transmission port 210 has a serial transmit data (PC_TXD) pin 212 and a data set ready (PC_DSR) pin 214. In one embodiment, the serial transmission port 210 is an RS-232 port that is compliant with the RS-232 asynchronous transmission standard. The portable keyboard 200 establishes a connection to an external computer through the serial transmission port 210. On the other hand, the portable keyboard 200 is attached to the hand-held information processing device 100 through the main connection port 220. The main connection port 220 has a serial receive data (PDA_RXD) pin 222, a main control (PDA_GPI1) pin 224 and a data terminal ready (PDA_DTR) pin 226. The route selection unit 250 includes three digital control analog switches 252~256 controlled by a select signal SEL. The analog switch 252 has its terminals $X_0$ and $X_1$ respectively coupled to the KB_TXD pin 242 and the PC_TXD pin 212, and has its terminal A coupled to PDA_RXD pin 222. The analog switch 254 has its terminal $Y_0$ coupled to the KB_GPI1 pin 244, and has its terminal B coupled to PDA_GPI1 pin 224. The analog switch 256 has its terminal $Z_1$ coupled to the PC_DSR pin 214, and has its terminal C coupled to PDA_DTR pin 226.

When the select signal SEL is logic "0", the terminals A, B and C are connected to terminals $X_0$, $Y_0$ and $Z_0$. As a result, the route selection unit 250 establishes the second transmission route $P_2$ to electrically couple the KB_TXD pin 242 to the PDA_RXD pin 222, to electrically couple the KB_GPI1 pin 244 to the PDA_GPI1 pin 224 and make the PDA_DTR pin 226 electrically floating. Therefore, the keyboard controller 240 passes keyboard and control signals from the KB_TXD pin 242 and the KB_GPI1 pin 244 through the PDA_RXD pin 222 and the PDA_GPI1 pin 224 to the hand-held device 100.

When the select signal SEL is logic "1", the terminals A, B and C are connected to terminals $X_1$, $Y_1$ and $Z_1$. Consequently, the route selection unit 250 establishes the first transmission route $P_1$ to electrically couple the PC_TXD pin 212 to the PDA_RXD pin 222, to electrically couple the PC_DSR pin 214 to the PDA_DTR pin 226 and make the PDA_GPI1 pin 224 electrically floating. Thus, the hand-held device 100 receives data from the computer 150 through the PC_TXD pin 212 and the PDA_RXD pin 222, and sends a data terminal ready signal from the PDA_DTR pin 226 through the PC_DSR pin 214 to the computer 150.

The sync button 230 is provided for generating a trigger signal to switch the portable keyboard 200 from keyboard function to data synchronization. The sync button 230 has its third terminal 232 connected to a power source Vcc through a resistor 270 to receive a high logic level. Furthermore, the sync button 230 has its first output terminal 236 coupled to the PDA_GPI1 pin 224 and has its second output terminal 234 coupled to one input terminal of the combinational logic circuit 260. The other input terminal of the combinational logic circuit 260 is coupled to the PC_DSR pin 214.

The combinational logic circuit 260 produces the select signal SEL at its output terminal 262. When the sync button 230 is pressed, the sync button 230 has its first input terminal 236, its second input terminal 234 and its third terminal 232 connected together to form a short circuit so that logic "1" is produced at the first and the second input terminals 236, 234. When the sync button 230 is released, the sync button 230 has its first input terminal 236, its second input terminal 234 and its third terminal 232 disconnected to form an open circuit so that logic "0" is produced at the first and the second input terminals 236, 234. Further, the combinational logic circuit 260 sets the select signal SEL to be logic "1" except when the second output terminal 234 and the PC_DSR pin 214 both are at logic "0".

Figure 3B:
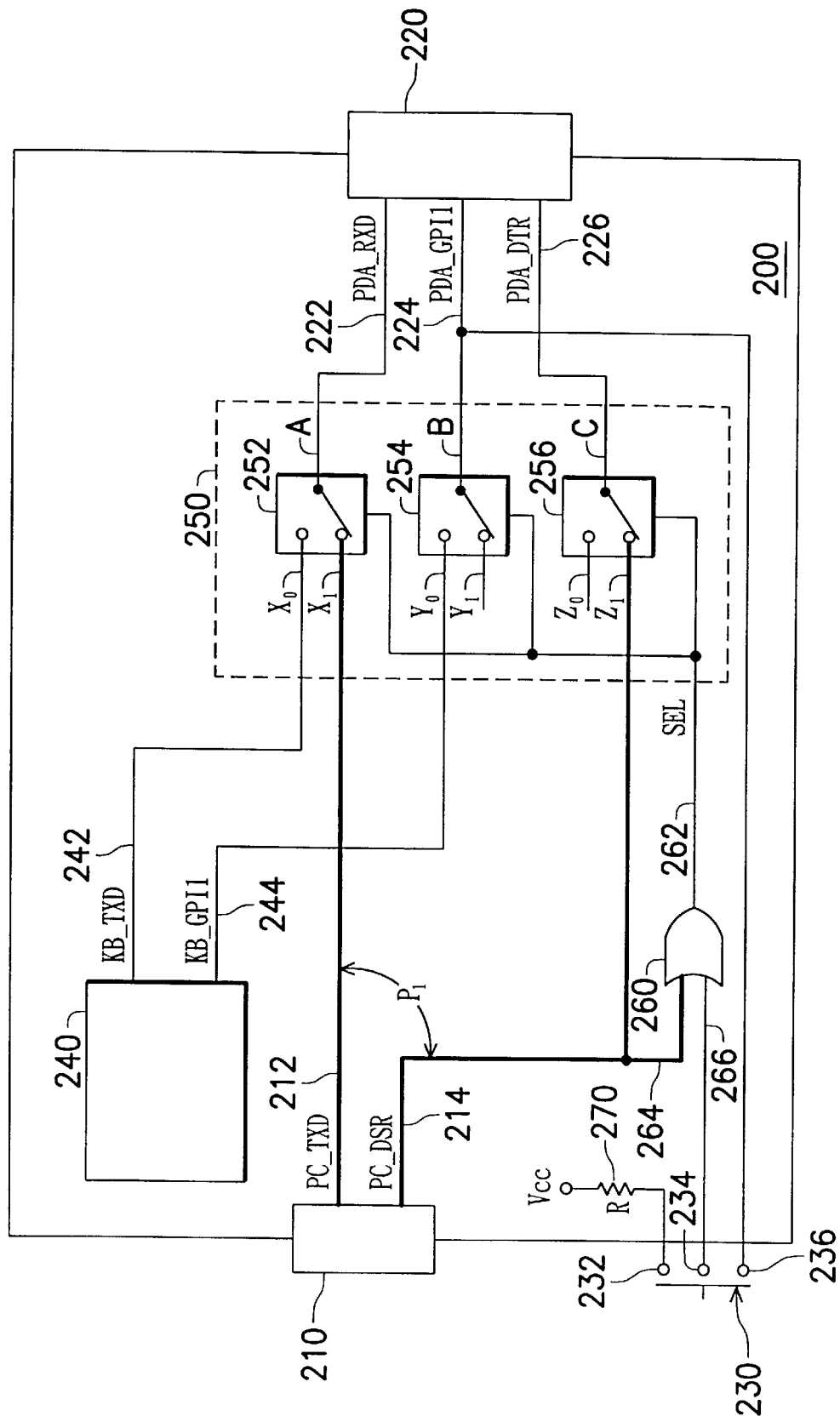
FIG. 3B is schematic diagram illustrating data synchronization between the hand-held information processing device and a computer according to the invention.

With reference to FIG. 3B, the operation of the data synchronization between the hand-held information processing device 100 and the computer 150 is illustrated as follows:

(a) When the sync button 230 is pressed, the sync button 230 produces a high logic pulse at the PDA_GPI1 pin 224 coupled to its first input terminal 236. This activates the hand-held information processing device 100 to perform data synchronization. Therefore, the hand-held device 100 pulls up its output of the PDA_DTR pin 226 to logic "1". In this manner, the combinational logic circuit 260 sets the select signal SEL to be the high logic pulse, such that the PC_TXD pin 212 is electrically coupled to the PDA_RXD pin 222 and the PC_DSR pin 214 is electrically coupled to the PDA_DTR pin 226.

(b) Once the sync button 230 is pressed and released, the high logic level is fed to the combinational logic circuit 260 from the PDA_DTR pin 226 so that the select signal SEL is maintained at logic "1". Hence, this allows the first transmission route P$_1$ between the main connection port 220 and the transmission port 210 to continue establishing. That is, when the hand-held device 100 performs data synchronization through the main connection port 220 and the serial transmission port 210, the hand-held device 100 changes the output of the PDA_DTR pin 226 from logic "0" to logic "1". As a result, the PC_DSR pin 214 coupled to the PDA_DTR pin 226 is maintained at logic level "1" to allow the combinational logic circuit 260 maintaining the select signal SEL at logic "1" too.

(c) After the data synchronization, the hand-held device 100 changes the output of the PDA_DTR pin 226 from logic "1" to logic "0". Therefore, the PC_DSR pin 214 coupled to the PDA_DTR pin 226 returns to logic "0" to allow the combinational logic circuit 260 to change the select signal SEL into logic "0". Consequently, the route selection unit 250 connects its terminals A, B and C to the terminals $X_0$, $Y_0$ and $Z_0$ to establish the second transmission route P$_2$, in which the KB_TXD pin 242 is electrically coupled to the PDA_RXD pin 222, the KB_GPI1 pin 244 is electrically coupled to the PDA_GPI1 pin 224 and the PDA_DTR pin 226 is electrically floating. In this way, the portable keyboard 200 automatically returns to keyboard function.

Accordingly, the present invention discloses an input apparatus for a hand-held information processing device. The input apparatus provides both keyboard and data synchronization functions, and it also switches to keyboard function automatically after completion of data synchronization.

While the invention has been described by way of example and in terms of the preferred embodiment, it is to be understood that the invention is not limited to the disclosed embodiment. To the contrary, it is intended to cover various modifications and similar arrangements as would be apparent to those skilled in the art. Therefore, the scope of the appended claims should be accorded the broadest interpretation to encompass all such modifications and similar arrangements.

What is claimed is:

1. An input apparatus of a hand-held information processing device, for selectively connecting the hand-held information processing device to a computer, comprising:

a main connection port, adapted to connect the hand-held information processing device;

a transmission port, adapted to connect the computer;

a route selection unit, coupled between the main connection port and the transmission port, configured to selectively establish a first transmission route between the main connection port and the transmission port; and a user selection device, configured to selectively output a first logic level and a second logic level, outputting the first logic level to cause the route selection unit to disconnect the first transmission route, and outputting the second logic level to cause the route selection unit to connect the first transmission route.

2. The input apparatus according to claim 1 further comprising an input controller coupled to the route selection unit, wherein the route selection unit is configured to selectively establish a second transmission route between the main connection port and the input controller, and to connect the second transmission route when the user selection device outputs the first logic level.

3. The input apparatus according to claim 2 wherein the input controller is a keyboard controller.

4. The input apparatus according to claim 1 wherein the transmission port is an RS-232 port compliant with the RS-232 asynchronous transmission standard.

5. The input apparatus according to claim 1 wherein the user selection device comprises a sync button having a first and a second output terminals, and providing the first logic level and the second logic level at the first output terminal and the second output terminal, respectively.

6. The input apparatus according to claim 1 wherein the first transmission route comprises a control route, and the hand-held information processing device passes a control signal through the control route to control a sustain period of the second logic level.

7. A portable keyboard for using in a hand-held information processing device, comprising:

a keyboard controller having a keyboard transmit data pin and a keyboard control pin;

a serial transmission port having a serial transmit data pin and a data set ready pin;

a main connection port having a serial receive data pin, a main control pin and a data terminal ready pin, adapted to connect the portable keyboard to the hand-held information processing device;

a route selection unit, for selecting the keyboard transmit data pin to electrically couple to the serial receive data pin, selecting the keyboard control pin electrically couple to the main control pin and making the data terminal ready pin electrically open when the select signal is at a first logic level, and for selecting the serial transmit data pin to electrically couple to the serial receive data pin, selecting the data set ready pin electrically couple to the data terminal ready pin and making the main control pin electrically open when the select signal is at a second logic level;

a sync button having a first output terminal electrically coupled to the main control pin and having a second output terminal, configured to provide the first logic level and the second logic level at the first output terminal and the second output terminal, respectively; and a combinational logic circuit producing the selected signal, one input terminal of the combinational logic circuit electrically coupled to the data set ready pin, and the other input terminal of the combinational logic circuit electrically coupled to the second output terminal of the sync button, wherein the combinational logic circuit sets the select signal to be the second logic level except when the second output terminal of the sync button and the data set ready pin both are at the first logic level.

8. The portable keyboard according to claim 7 wherein the sync button comprises a first input terminal, a second input terminal and a third terminal receiving a high logic level, when the sync button is activated the first input terminal, the second input terminal and the third terminal are connected together and kept at the high logic level, and when the sync button is deactivated the first input terminal, the second input terminal and the third terminal are disconnected and the first and the second input terminals are kept at a low logic level.

9. The portable keyboard according to claim 8 wherein the first logic level is the low logic level and the second logic level is the high logic level.

10. The portable keyboard according to claim 9 wherein the sync button is pressed and released to produce a high logic pulse at the main control pin coupled to the first input terminal of the sync button, thereby activating the hand-held information processing device to perform data synchronization through the main connection port and the serial transmission port.

11. The portable keyboard according to claim 10 wherein the combinational logic circuit sets the select signal to be the high logic pulse after the sync button is pressed and released, and thus the serial transmit data pin is electrically coupled to the serial receive data pin and the data set ready pin is electrically coupled to the data terminal ready pin.

12. The portable keyboard according to claim 11 wherein the data set ready pin is at the high logic level during the data synchronization, such that the data terminal ready pin coupled to the data set ready pin is maintained at the high logic level to also allow the combinational logic circuit to maintain the select signal at the high logic level.

13. The portable keyboard according to claim 12 wherein the data set ready pin becomes the low logic level after the data synchronization, such that the data terminal ready pin coupled to the data set ready pin returns to the low logic level to allow the combinational logic circuit changing the select signal into the low logic level.

14. The portable keyboard according to claim 13 wherein the select signal becomes the low logic level after the data synchronization, such that the keyboard transmit data pin is electrically coupled to the serial receive data pin and the keyboard control pin is electrically coupled to the main control pin.

15. The portable keyboard according to claim 7 wherein the serial transmission port is an RS-232 port compliant with the RS-232 asynchronous transmission standard.

* * * * *